UNITED STATES PATENT OFFICE.

MARIE LOUISE BOUCHET, OF ROSELLE, NEW JERSEY.

MACARONI AND THE LIKE FOOD PRODUCT.

1,299,819.

No Drawing.

Specification of Letters Patent.  Patented Apr. 8, 1919.

Application filed August 2, 1913. Serial No. 782,712.

*To all whom it may concern:*

Be it known that I, MARIE LOUISE BOUCHET, a citizen of the United States of America, residing at Roselle, in the county of Union, State of New Jersey, have invented a new and useful Macaroni and the like Food Product; and I do hereby declare the following to be a full, clear, and exact description of the same.

The object of this invention is to produce macaroni or like food product of high nutritious value and which is extremely healthful.

In the manufacture of the new macaroni, the operator first takes wheat in the form as gathered from the plant, and without removing the bran, carefully cleans the wheat by any suitable means.

As soon as possible after cleaning, the wheat should be crushed or ground to a farina-like state,—one in which the bran and also the gluten parts are converted into a homogeneous whole, and, as hereinabove stated, ground so fine that all of the natural salts are easily soluble from the bran and are easily absorbed in the human alimentary canal.

Immediately the milling is completed, I add water (near to the boiling point) and also salt, or salted water, and this mixing is continued for from twenty minutes to one-half an hour. In practice, the proportion of water to that of salt has been from fifty to one hundred parts of water to one part of salt. The salt apparently releases the ash and the fat contained in the bran.

The product is of a golden brown color, and has greater strength and durability than the usual macaroni. It is cheap to manufacture, highly nutritious, and apparently more healthful, in view of the belief, now expressed by many eminent physicians and food specialists, that whole wheat, meaning all parts thereof, is more beneficial and more easily digested than the ordinary white flour resulting from grinding only a portion of the wheat.

What I claim is:

The process of preparing a whole-wheat macaroni consisting in mixing water and salt with finely ground whole wheat—the proportions being from one part of salt to fifty parts of water to one part of salt to one hundred parts of water—kneading the aforesaid mixture for not less than three quarters of an hour, forming the dough into tubular bodies, and slowly drying the tubular bodies.

In testimony whereof, I have signed my name to this specification in the presence of two subscribing witnesses.

MARIE LOUISE BOUCHET.

Witnesses:
MARY E. McDEVITT,
JOHN M. WALSH.

Copies of this patent may be obtained for five cents each, by addressing the "Commissioner of Patents, Washington, D. C."